United States Patent [19]

Smierciak et al.

[11] Patent Number: 5,075,378

[45] Date of Patent: Dec. 24, 1991

[54] COATING OF AN EPOXY RESIN, FLUOROCARBON POLYMER FLUORINATED CURING AGENT

[75] Inventors: Richard C. Smierciak, Streetsboro; Paul J. Giordano, Hudson, both of Ohio

[73] Assignee: The Standard Oil Company, Cleveland, Ohio

[21] Appl. No.: 65,750

[22] Filed: Jun. 24, 1987

Related U.S. Application Data

[63] Continuation of Ser. No. 812,222, Dec. 23, 1985, abandoned.

[51] Int. Cl.$^5$ .................. C08L 63/02; C08L 63/04; C08L 63/08
[52] U.S. Cl. ...................... 525/109; 525/113; 525/114; 525/118; 525/121; 525/208; 525/55; 525/151
[58] Field of Search .............. 525/121, 109, 113, 114, 525/118, 208, 55, 151

[56] References Cited

U.S. PATENT DOCUMENTS

| | | | |
|---|---|---|---|
| 2,976,257 | 3/1961 | Dawe et al. ................. | 525/121 |
| 3,023,189 | 2/1962 | Jupa et al. .................. | 260/45.5 |
| 3,852,222 | 12/1974 | Fields et al. ................ | 260/2 |
| 3,872,045 | 3/1975 | Fields et al. ................ | 260/31.2 |
| 4,098,756 | 7/1978 | Miller et al. ................ | 525/121 |
| 4,132,681 | 1/1979 | Field et al. .................. | 260/836 |
| 4,324,715 | 4/1982 | Emerick ...................... | 525/121 |
| 4,483,898 | 11/1984 | Schonhorn et al. ......... | 428/356 |
| 4,489,196 | 12/1984 | Schmiegel .................. | 525/326.3 |
| 4,596,855 | 6/1986 | Stewart ....................... | 525/200 |
| 4,742,120 | 5/1988 | Higaki et al. ................ | 525/151 |

FOREIGN PATENT DOCUMENTS

| | | | |
|---|---|---|---|
| 0084771 | 11/1983 | European Pat. Off. . | |
| 2396785 | 3/1979 | France ....................... | 525/121 |
| 55-5928 | 1/1980 | Japan ......................... | 525/121 |
| 57-115427 | 7/1982 | Japan ......................... | 525/530 |
| 8001361 | 10/1980 | PCT Int'l Appl. . | |
| 1462782 | 1/1977 | United Kingdom ........ | 525/121 |
| WO8101149 | 4/1981 | World Int. Prop. O. . | |

OTHER PUBLICATIONS

International Search Report; PCT/US80/0136.

*Primary Examiner*—Melvyn I. Marquis
*Assistant Examiner*—Robert E. L. Sellers, II
*Attorney, Agent, or Firm*—Larry W. Evans; Joseph G. Curatolo; Teresa W. Gilbert

[57] ABSTRACT

A multifunctional coating composition comprising a fluorocarbon polymer, an epoxy resin and a fluorinated curing agent resulting in a fluorinated epoxy resin network with improved properties of corrosion resistance and hydrophobicity.

9 Claims, No Drawings

COATING OF AN EPOXY RESIN, FLUOROCARBON POLYMER FLUORINATED CURING AGENT

This is a continuation of co-pending application Ser. No. 812,222 filed Dec. 23, 1985, now abandoned.

BACKGROUND OF THE INVENTION

The present invention is directed generally to fluorinated epoxy fluoropolymer compositions for use as protective surface coatings on various substrates such as metal, wood, plastic, paper and the like. This invention relates to novel 100 percent solids fluorinated epoxy fluoropolymer coating compositions. In another aspect, the invention relates to novel coating compositions and the process for producing the coating compositions which have excellent corrosion resistance and good adhesion as well as good release properties and hydrophobicity.

There is demand in the industry for protective coatings that will withstand the effects of a variety of severe environmental conditions. Many varieties of coating compositions are currently available that are based on various polymeric materials. Coating compositions containing highly fluorinated epoxy resin, generally can be made by dissolving the resins in suitable solvents and then adding to this solution suitable highly fluorinated fillers. Solvent based coatings are disadvantageous in that large amounts of volatile organic solvents are present. These solvents may be costly and hazardous. The solvents must be removed from the final coatings which requires considerable thermal energy. Further, if hazardous, the solvents must be recovered or incinerated as they may not be exhausted into the environment. Water based coatings are disadvantageous in that they are not continuous and have been found to contain more pinholes and voids than the solvent based coatings.

As a result, the search for an essentially solvent-free coating process has led to the use of solventless systems. The advantages of a solventless coating system includes the minimization of surface defects due to the absence of solvents and excellent heat and chemical resistance.

Hydrophobicity is a property needed in coatings so that they can withstand varied environmental conditions. Epoxy fluorocarbon coatings are limited in their hydrophobic properties by the level of fluorocarbon that can be dispersed in the coating composition. The fluorine content can be increased by employing fluorine in the epoxy matrix backbone of an epoxy fluorocarbon polymer of the instant invention thereby increasing the hydrophobicity of the coating composition.

It is an object of this invention to provide a fluorinated epoxy fluoropolymer coating composition in a 100 percent solids, solvent free system to avoid use of cyclable solvents. It is another object of this invention to employ fluorine in the epoxy matrix backbone of the epoxy fluorocarbon polymer resulting in an improved hydrophobic coating composition. It is another object of this invention to produce a coating composition that exhibits excellent adhesion and wetting to the substrate, good flexibility, hydrophobicity and excellent corrosion resistance.

These and other objects, together with the advantages over known methods shall become apparent from the specification which follows and are accomplished by the invention as hereinafter described and claimed.

SUMMARY OF THE INVENTION

It has now been found that a dispersion system of a fluorocarbon polymer, an epoxy resin and a fluorinated curing agent results in a multifunctional coating comprised of a fluorinated epoxy resin network with improved properties. The present invention includes a solventless coating system based on the multi-functional epoxy resin which serves as a reactant with and a solvent for the fluorocarbon polymer. The present invention produces a fluorinated epoxy fluorocarbon polymer by the reaction of a fluorinated curing agent with an epoxy resin and fluorocarbon polymer which results in crosslinking of the epoxy resin and the addition of fluorine in the epoxy resin backbone by the fluorinated curing agent. The epoxy resin is crosslinked to form a highly fluorinated epoxy resin.

This invention relates to coating compositions comprising polymerized fluorinated epoxy resin, fluorocarbon polymer, in particular polytetrafluoroethylene (PTFE), wherein the weight percent of the fluorocarbon polymer is about 5 to about 24 percent of the total weight of the coating composition and a fluorinated curing agent.

The invention further includes a process to produce said coating compositions comprising:

1) forming a dispersion of fluorocarbon polymer in an epoxy resin, 2) adding a fluorinated curing agent to the dispersion to form a mixture, 3) applying the mixture to a substrate to form a coating, and 4) curing the coating so that the epoxy resin crosslinks with the fluorinated curing agent resulting in a polymerized fluorinated epoxy fluorocarbon coating.

The fluorinated epoxy fluorocarbon polymer coating compositions of this invention can be used for industrial corrosion protection of substrates where coating properties such as hydrophobicity, good release properties, adhesion and corrosion resistance are important. Major uses for the coatings are in the chemical processing industry for reactors, stirrers, pipes and tankers. Further, the coating compositions may also be used in other fields such as anti-biofouling, anti-icing, electrical insulation and the like.

DETAILED DESCRIPTION OF THE INVENTION

The coating composition of the instant invention comprises a dispersion of a fluorocarbon polymer in an epoxy resin which is cured by a fluorinated curing agent resulting in a fluorinated epoxy fluorocarbon polymer.

The coating compositions of the present invention contain an epoxy resin. Epoxy resins are characterized by the presence of a three-membered cyclic ether group commonly referred to as an epoxy group which is represented as follows:

There are two distinct classes of epoxy resins, diglycidyl ethers of bisphenol A and Novolak Epoxy resins. Molecular weight and epoxide equivalent are controlled by varying the reactant ratios. The epoxy resin functions as a dispersing resinous vehicle and matrix for the fluorocarbon polymer. The coating compositions of the present invention are classified as 100 percent solids because they contain essentially no volatile solvents. The fluorocarbon polymer is uniformly dispersed in the epoxy resin resulting in a network of fluoropolymer which is homogeneously dispersed throughout the epoxy matrix. However, minor amounts of solvents may optionally be used which may be volatile, which does not defeat the object of this invention, to provide a substantially 100 percent solid coating compositions.

These epoxy resins can be employed either alone or in combination. The coatings compositions generally contain, in percent of the total weight, from about 25 percent to about 95 percent, preferably from about 30 percent to about 75 percent of the epoxy resin.

The conventional epoxy resins are diglycidyl ethers of bisphenol A derived from bisphenol A (4,4$^1$-isopropylidenediphenol) and epichlorohydrin. The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

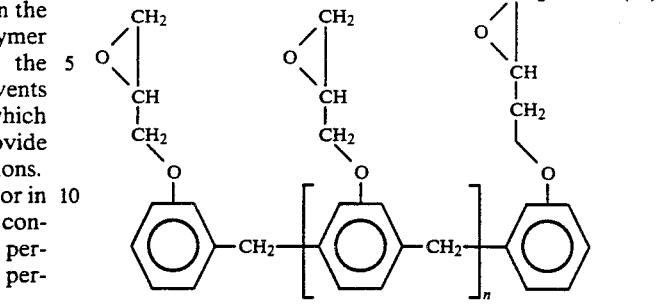

The Epoxy Novolak resin can range from a high viscosity liquid, (an example of which is formula III, where n averages about 0.2) to a solid, (where the value of n in formula III is greater than 3).

Many other epoxide materials are available in polymerizeable monomeric or prepolymeric forms. Typical epoxide or polyepoxide materials include but are not limited to cyclohexene oxides, epoxidized cycloalkenes,

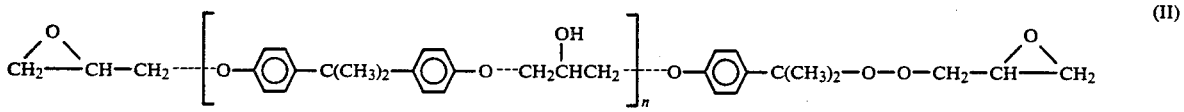

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A (represented in formula II, where n=less than one), which may be named 2,2-bis(p-(2,3-epoxypropoxy)phenyl)propane, and smaller proportions of polymers in which n is an integer equal to 1, 2, 3, etc. This product exemplifies epoxide monomers and prepolymers, having a moderate molecular weight, preferably of the order of 1,000 or less, which may be crosslinked or otherwise polymerized in accordance with the invention. Solid diglycidyl ethers of bisphenol A are also useful epoxy resins for the instant invention. The structure is the same structure as above, in formula II, except the average value of n ranges from 1 to 20. High molecular weight diglycidyl ethers of bisphenol A are also useful for the instant invention. The molecular weight of the product is a function of the ratio of epichlorohydrin-bisphenol A. The average value of n ranges from 1 to 20 and as the n value becomes greater the molecular weight of the resin increases.

The novolak epoxy resins are obtained by the known reaction of epichlorohydrin with a novolak resin. First, a phenol-formaldehyde type resin is obtained primarily by the use of acid catalysts and an excess phenol. The epoxy phenol-novolak resins are then prepared from the phenol-formaldehyde condensation products with subsequent epoxidation, utilizing epichlorohydrin. The structure usually assigned this resinous structure is glycidyl esters of acrylic acid, glycidyl alkyl ethers, glycidyl aryl ethers, esters of epoxidized cyclic alcohols, esters of epoxidized cycloalkanecarboxylic acids, halogenated epoxides, styrene oxide, bisphenol F epoxides, and others.

The cyclohexene oxides and their derivatives and homologues useful as epoxide materials include but are not limited to cyclohexene oxide, 1,2-epoxycyclohexene, vinylcyclohexene dioxide, more specifically named 3-(epoxyethyl)-7-oxabicyclo (4.1.0) heptane, and 1,2-epoxy-4-(epoxyethyl)cyclohexane. Most preferred is cyclohexene oxide.

The epoxidized cycloalkenes and their derivatives and homologues useful as epoxide materials include but are not limited to the derivatives of ethylene oxide, propylene oxide, trimethylene oxide, 3,3-bis(chloromethyl)-oxetane, tetrahydrofuran, dicyclopentadiene dioxide, 1,3,5-trioxane as well as 2,3 epoxybutane, polycyclic diepoxide and 3,4-8,9-diepoxy tricyclo-[5.2.1.0$^{2,4}$]-decane. Most preferred is polycyclic diepoxide.

The glycidyl esters of acrylic acid and their derivatives and homologues include but are not limited to the glycidyl derivatives of methacrylic acid, acrylonitrile, crotonic acid, as well as allylglycidyl ether, 1-allyloxyl-2,3-epoxypropane, glycidyl phenyl ether, and 1,2-epoxy-3-phenoxypropane. Most preferred are epoxidized methacrylic acid and acrylonitrile. However, coating compositions must be prepared with at least one non-epoxy-nitrile monomer.

The glycidyl alkylethers and their derivations and homologues include but are not limited to glycidyl octyl ether, dicyl glycidyl ether, dodecyl glycidyl ether and glycidyl tetradecyl ether. Most preferred is epoxidized glycidyl octyl ether.

The glycidyl aryl ethers and their derivatives and homologues include but are not limited to benzyl glycidyl ether, methyl benzyl glycidyl ether, dimethyl benzyl glycidyl ether, ethyl glycidyl ether. Most preferred is benzyl glycidyl ether.

Esters of epoxidized cyclic alcohols or of epoxidized cycloalkanecarboxylic acids or of both and their derivatives and homologues include but are not limited to esters of epoxidized cyclohexanemethanol and epoxidized cyclohexane-carboxylic acid such as diepoxide (3,4-epoxy-cyclohexyl) methyl 3,4-epoxycyclohexane-carboxylate, esters of a substituted (epoxycycloalkyl) methanol and a dibasic acid such as bis (3,4-epoxy-6-methylcyclohexyl)-methyl) adipate. Diepoxide monomeric materials may be obtained conveniently as bis-(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, that is 2,2-bis-[p-(2,3-epoxypropoxy)-phenyl] propane.

Reactive diluents may be used such as 1,2 epoxy dodecane and the like.

The second component of the coating compositions of the present invention is a fluorocarbon polymer. The fluorocarbon polymers used are those of hydrocarbon monomers that are perfluorinated. The fluorocarbon polymers used are in powder, granular or micropowdered form.

These fluorocarbon polymers can be employed in the coating composition either alone or in combination. The coating compositions generally contain, in percent of total weight, from about 5 percent to about 24 percent, preferably from about 10 percent to about 20 percent of powdered fluorocarbon polymers.

Typical fluorocarbon polymers include but are not limited to homologues and derivatives of polytetrafluoroethylene, teflon ® FEP—a fluorinated ethylene propylene which is a copolymer of tetrafluorethylene and hexafluoropropylene, teflon ® ETFE-tetrafluoroethylene, teflon ® PFA-perfluoroalkyloxy resin, Tefzel ®-modified copolymer of ethylene and tetrafluoroethylene and the like. Most preferred is polytetrafluoroethylene.

The third component of the coating compositions of the instant invention is a fluorinated curing agent. The fluorinated curing agents are stoichiometric curing agents for the epoxy resin. The fluorinated curing agent effects crosslinking of the epoxy resin and the fluorinated curing agent resulting in a fluorinated epoxy resin. The use of the fluorinated curing agent component in the coating composition physically integrates the fluorine in the epoxy resin backbone as a crosslinker, and increases the weight percent of fluorine in the coating composition.

The fluorinated curing agents can be employed either alone or in combination. The coating compositions generally contain, in percent of total weight from about 10 percent to about 70, preferably from about 20 percent to about 60 percent and most preferably from about 30 percent to about 50 percent of fluorinated curing agent.

The fluorinated curing agents of this invention are stoichiometric curing agents for the epoxy resin which have low volatility such that it remains in the coating to effect a cure and is reactivated at low temperatures of 150° C. and less.

The fluorinated curing agents of the instant invention include the fluorinated alcohols, fluorinated amines, fluorinated anhydrides, fluorinated diols, fluorinated phenols and the like. Typical fluorinated curing agents include but are not limited to homologues and derivatives of 4-aminobenzotrifluoride, 4,4'-diaminooctafluorobiphenyl, 3-5-Bis(trifluoromethyl)aniline, 2,2,3,3,4,4-hexafluoro-1,5-pentanediol, decafluoropropionic anhydride, heptafluorobutyric anhydride, 4,4'-(hexafluoroisopropylidene)diphenol, tetrafluororesorcinol, 4,4'-dihydroxyoctafluoro biphenyl and the like. Preferred are 4,4'diaminooctafluorobiphenyl, 4-aminobenzotrifluoride, 3-5-Bis(trifluoromethyl)analine, 2,2,3,3,4,4-hexafluoro-1,5-pentanediol, 4,4'-(hexafluoroisopropylidene)diphenol and tetrafluororesorcinol. Most preferred is 4,4'-(hexafluoroisopropylidene)diphenol and tetrafluororesorcinol.

The coating composition of the instant invention is cured at about 80° C. to about 150° C., preferably about 90° C. to about 100° C. generally for about 15 minutes to 12 hours perferably from about one-half hour to about 6 hours and most preferably from about 1 hour to about 2 hours.

The fluorinated curing agents may be employed in conjunction with an accelerator that is compatable with the fluorinated curing agent and the coating composition. Accelerators generally reduce the time required for polymerization of the coating composition so that the pot life, cure temperature and cure time can be controlled and at the same time improve the aging and other physical properties of the coating composition. The accelerators and the use thereof are generally well known in the art. Exemplary accelerators are Lewis bases, in particular, aliphatic and aromatic tertiary amines such as N,N-dimethyl benzylamine, triethanol amine tris(dimethylaminomethyl)phenol, dimethylaminomethyl phenol and the like.

It will be readily apparent to those skilled in the art that the coating compositions of the instant invention may be further modified by the addition of plasticizers, stabilizers, pigments, dispersants, defoamers, surfactants, extenders, fillers, reinforcing agents and other film formers. The coating compositions of the instant invention may also optionally contain various flattening agents, surface active agents, thixotropic agents, UV light absorbers, flow control agents, viscosity agents, antioxidant agents and dyes. All these additives and the use thereof are well known in the art and do not require extensive discussion, it being understood that any compound possessing the ability to function in such a manner, i.e., as a flattening agent, surface active agent, UV light absorber and the like, can be used so long as they do not deleteriously affect the curing of the coating composition and do not adversely affect the characteristics of the coating. It will be appreciated therefore that the epoxy resins, fluorocarbon polymers, fluorinated curing agents and any other modifiers should be chemically compatible with each other.

In the practice of this invention, the coating composition precursor is first compounded by adding together the epoxy resins and the fluorocarbon polymers to form generally a uniform dispersion. To this dispersion is added the fluorinated curing agent, with stirring to form a mixture. Optionally, at any step in the process prior to the cure, any of the aforementioned additives may be stirred into the mixture. The various components are thoroughly mixed so as to form a uniform dispersion mixture of the coating composition's components.

A relatively uniform film of coating mixture is applied onto a substrate by any of the known means such as wire wound rod, Guardco ® wet film applicator rods, knife, bar, airless spraying, dipping, roller coating, flowing, brushing, conventional and/or electrostatic spray gun, electrodeposition and the like. The various substrates employed can be wood, paper, metal, pretreated metal, plastic and the like. Generally, the coating composition is applied in an amount sufficient to provide a dry cured coating thickness of from about 1 mil to about 100 mil, preferably from about 10 mil to about 70 mil and most preferably from about 20 mil to about 50 mil. Optionally, multiple coats of the composition may be applied to the substrate. By selection of components and additives the coating compositions may be applied both as translucent coatings or opaque coatings.

The coating mixture is then cured and solidified to form the coating composition. The coating composition is cured at a temperature from about 80° C. to about 150° C., preferably about 90° C. to about 100° C. for about 15 minutes to 12 hours, preferably from about one-half hour to about 6 hours and most preferably from about 1 hour to about 2 hours. After cure, there is present on the surface of the substrate a hard, nontacky, hydrophobic, adherent and chemically resistant coating which tenaciously adheres to the substrate.

The coating compositions of the present invention are fluorinated epoxy fluorocarbon polymers which are produced by dispersing fluorocarbon polymers in an epoxy resin and curing the mixture with a fluorinated curing agent. The fluorinated curing agent puts fluorine into the epoxy resin thus the fluorine becomes an integral part of the epoxy resin backbone as a crosslinker. It is theorized that this allows for increased homogeneity, wetting and compatibility of the fluorocarbon which is physicaly situated in the epoxy matrix. Further, employing fluorinated curing agents as a component of the coating composition increases the fluorine content in the composition resulting in improved hydrophobicity, flexibility and plasticity. The coatings' superior properties are derived not only from the ability of the fluorinated curing agent to crosslink and graft with the epoxy resin but also from the dispersion of fluorocarbon polymer in the epoxy resin matrix.

The fluorinated epoxy fluorocarbon polymer coating compositions of the present invention exhibits excellent adhesion and wetting to metallic substrates, improved flexibility and good hydrophobicity and excellent corrosion resistance.

SPECIFIC EMBODIMENT 57.0 g of Shell Epon ® 828 liquid epoxy resin (available from Shell Oil Co., Chicago, Ill., commercial grade) and 0.3 g of 3M fluorad ® FC-430 fluorosurfactant (available from 3M Co., St. Paul, Minn., commercial grade) was charged into a 250 ml beaker and rapidly dispersed using a cowles blade. 31.7 g of 2,2,3,3,4,4-hexafluoropentane-1,5-diol was added with rapid dispersing. The mixture was continuously stirred for 15 minutes. 10. g of DLX-6000 micropowdered polytetrafluorethylene (available from E. I. DuPont de Nemours and Co., Wilmington, Dela.) was added to the mixture with continuous mixing for 15 minutes to 30 minutes. 1 weight percent of N,N-dimethyl benzylamine was added to the dispersion by stirring.

The dispersion was then applied to the surface of 4"×6"×3/16" test panels of bare cold rolled steel with no conversion coating, that had been blast cleaned to a white metal Nace 1 finish.

The test panels were preheated to about 90° C. and the coating was applied to the warm test panel. The test panel was then cured at about 90° C. to about 125° C. for 30 minutes and then about 125° C. was maintained for another 30 minutes and then the temperature was gradually reduced to about 90° C. for the last 30 minutes. This cycle was repeated between each coat. Four coats were applied. After the last coat the test panels were post cured at about 150° C. for about 6 hours. The coatings were about 7 mil thick.

88.6 g of Shell Epon ® 828 liquid epoxy resin was mixed with 11.4 g of triethylene tetraamine to form a comparative standard epoxy coating composition mixture. The resulting mixture was stirred to form generally a homogeneous mixture of the comparative composition. The comparative composition was applied to the surface of 4"×6"×0.032" cold rolled steel untreated matte finish test panels. The coated panels were then cured at about 80° C. for 15 minutes. This cycle was repeated between each coat. Five coats were applied. After the last coat, the test panels were post cured at 100° C. for about 4 hours. The coatings were about 10 mil thick.

The coated test panels were tested in a test cell in which the test panel was horizontally attached to each end of the test cell consisting of a vertically oriented glass cylinder with a reflux condenser which can be capped at both ends by means of the test panel and about 4" outside diameter Teflon ® washers. The cylinder was about three-quarters filled with HCL solution and then heat was applied by means of a heating tape or "girdle" around the outside of the test cell. In this way, about a 3 inch circle of the top part of the coated test panel was exposed to a continuously condensing vapor phase of the test solution and about a 3 inch circle of the bottom part of the coated test panel was immersed in the refluxing test solution.

Duplicate test panels were subjected to the impact (ASTM D 2794-82) test which measures the tendency for a coating to crack after being deformed by an impacting force. A falling stainless steel ball weight hits a panel with the coated side down for the reverse impact test. The height of the fall in inches multiplied by the dropping weight in pounds is the impact energy. To pass the test, a standard tape is applied to the impacted area and snapped off and the coating must remain intact. Test ranges are from 0 to 160 inch-pounds (in-lb), with 160 meaning there is no loss of coating after the tape is snapped off and 0 meaning a failure.

The contact angle test measures the hydrophobicity of the coating. A droplet of pure water (18M) is placed on the coated test panel. Using a microscope and a camera the angle between the water droplet and the coated substrate is measured. The contact angle measured is the angle between a tangent line on the side of the droplet and the substrate. The higher the contact angle, the greater the hydrophobicity and the lesser the wetting.

The test panels in the corrosion control test showed no corrosion on the vapor and immersed panel after 100 hours. After 120 hours the vapor test panel composition of the instant invention showed 100 percent delamination with 100 percent corrosion present. The immersion test panel composition of the instant invention showed less than 50 percent corrosion products and about 20 to 25 percent delamination after 120 hours. The comparative epoxy coating vapor test panel showed 100 percent corrosion and 100 percent delamination after 80 hours. The comparative epoxy coating immersion test panel showed no corrosion and no delamination after 80 hours.

The corrosion control test results demonstrate that there is no significant difference between the comparative coating and the novel coating of the instant invention in the immersion test. However, in a vapor phase environment, which is a more severe test due to increased activity and permeability of gases the coating of the instant invention had no corrosion at 100 hours whereas the comparative coating failed at 80 hours. Thus, the novel coating composition of the instant invention shows enhanced results over the comparative coating composition.

The test panels for the reverse impact test was a 160 lb-in meaning the coating remained intact. In contrast, the comparative test panel for the reverse impact test was 10 lb-in. Accordingly, the coating composition of the instant invention demonstrates superior reverse impact strength compared to a standard epoxy coating composition.

The test panel coated with the composition of the instant invention measured a 88° contact angle, whereas, the comparative test panel had a 75° contact. Accordingly, the coating composition of the instant invention has greater hydrophobicity and lesser wetting than a comparative standard epoxy coating composition.

Although the invention has been described in detail through the preceding examples, these examples are for the purpose of illustration only, and it is understood that variations and modifications can be made by one skilled in the art without departing from the spirit and the scope of the invention as hereinafter claimed.

We claim:

1. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids, and said reactive diluent is 1,2-epoxy dodecane and combinations thereof, and about 10 percent to about 70 percent of a fluorinated curing agent selected from the group consisting 4-aminobenzotrifluoride, 4,4'-diaminooctafluorobiphenyl, 3-5-Bis(trifluoromethyl)aniline, 2,2,3,3,4,4-hexafluoro-1,5-pentanediol, decafluoropropionic anhydride, heptaflluorobutyric anhydride, tetrafluororesorcinol, 4,4'-dihydroxyoctafluoro biphenyl and mixtures thereof which physically integrates fluorine into the backbone of said epoxy resin, epoxide material or reactive diluent, thereby increasing the weight percent of fluorine in said coating composition.

2. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of 4-aminobenzotrifluoride which physically integrates fluorine into the backbone of said epoxy resin, epoxide material or reactive diluent, thereby increasing the weight percent of fluorine in said coating composition.

3. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of 4,4'-diaminooctafluorobiphenyl which physically integrates fluorine into the backbone of said epoxy resin, epoxide material or reactive diluent, thereby increasing the weight percent of fluorine in said coating composition.

4. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of bis(trifluoromethyl)aniline which physically integrates fluorine into the backbone of said epoxy resin, epoxide material or reactive diluent, thereby increasing the weight percent of fluorine in said coating composition.

5. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of 2,2,3,3,4,4-hexafluoro-1,5-pentanediol which physically integrates fluorine into the backbone of said epoxy resin, epoxide material or reactive diluent, thereby increasing the weight percent of fluorine in said coating composition.

6. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of decafluoropropionic anhydride which physically integrates fluorine into the backbone of said epoxy resin, epoxide material or reactive diluent, thereby increasing the weight percent of fluorine in said coating composition.

7. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of heptaflluorobutyric anhydride which physically integrates fluorine into the backbone of said epoxy resin, epoxide material or reactive diluent, thereby increasing the weight percent of fluorine in said coating composition.

8. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of tetrafluororesorcinol which physically integrates fluorine into the backbone of said epoxy resin, epoxide material or reactive diluent, thereby increasing the weight percent of fluorine in said coating composition.

9. A liquid, solvent free epoxy fluorocarbon coating composition curable at temperatures of from about 80° C. to 150° C. comprising about 5 percent to about 24 percent of a fluorocarbon polymer wherein said fluorocarbon polymer is selected from the group consisting of polytetrafluoroethylene, fluorinated ethylene propylene, tetrafluoroethylene, perfluoroalkyloxy resin and combinations thereof, about 25 percent to about 95 percent of an epoxy resin epoxide material or reactive diluent, wherein said epoxy resin is selected from the group consisting of a diglycidyl ether of bisphenol A and a novolak said epoxide material is selected from the group consisting of epoxy resin, cyclohexene oxide, epoxidized cycloalkene, glycidyl esters of acrylic acid, glycidyl alkyl ethers, glycidyl aryl ethers, esters of epoxidized cyclic alcohols and esters of epoxidized cycloalkanecarboxylic acids and said reactive diluent is 1,2-epoxy dodecane and combinations thereof, and about 10 percent to about 70 percent of a fluorinated curing agent of 4,4'-dihydroxyoctafluoro biphenyl which physically integrates fluorine into the backbone of said epoxy resin, epoxide material or reactive diluent, thereby increasing the weight percent of fluorine in said coating composition.

* * * * *